United States Patent

[11] 3,591,208

| [72] | Inventor | Ronald W. Nicolaus |
| | | Peoria, Ill. |
| [21] | Appl. No. | 821,316 |
| [22] | Filed | May 2, 1969 |
| [45] | Patented | July 6, 1971 |
| [73] | Assignee | Eclipse Fuel Engineering Co. |
| | | Rockford, Ill. |

[54] PRESSURE FITTING FOR PLASTIC TUBING
4 Claims, 1 Drawing Fig.

[52] U.S. Cl. .................................................. 285/250,
285/343, 285/348, 285/349
[51] Int. Cl. ................................................... F16l 33/18
[50] Field of Search ........................................ 285/250,
249, 248, 356, 343, 349, 350, 348

[56] References Cited
UNITED STATES PATENTS
2,466,526  4/1949  Wolfram .................... 285/349 X

| 2,467,312 | 4/1949 | Jack | 285/356 X |
| 2,470,546 | 5/1949 | Carlson | 285/250 |
| 3,074,747 | 1/1963 | Boughton | 285/348 X |
| 3,365,219 | 1/1968 | Nicolaus | 285/356 X |

FOREIGN PATENTS
428,677  5/1935  Great Britain ................ 285/343

*Primary Examiner*—Thomas F. Callaghan
*Attorney*—Norman H. Gerlach

ABSTRACT: A pressure fitting for connecting a metal pipe to a length of plastic tubing, the fitting being in the form of an adapter wherein the pressure of a nut, which is screwed into a fitting body, shrinks a split retaining ring tightly upon the plastic tubing to prevent tube pullout, and also compresses a sealing ring between the fitting body and the tubing.

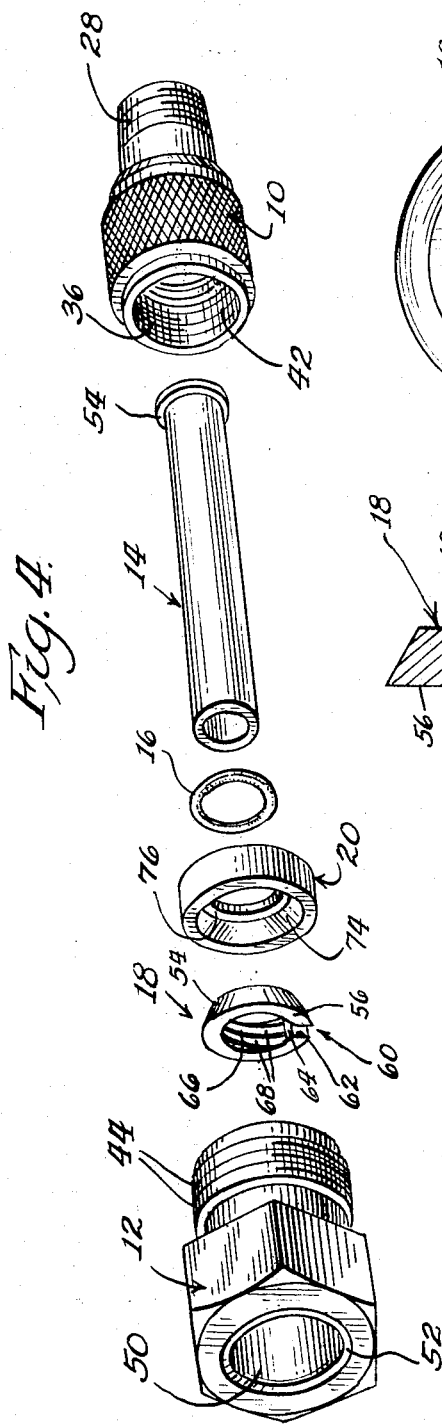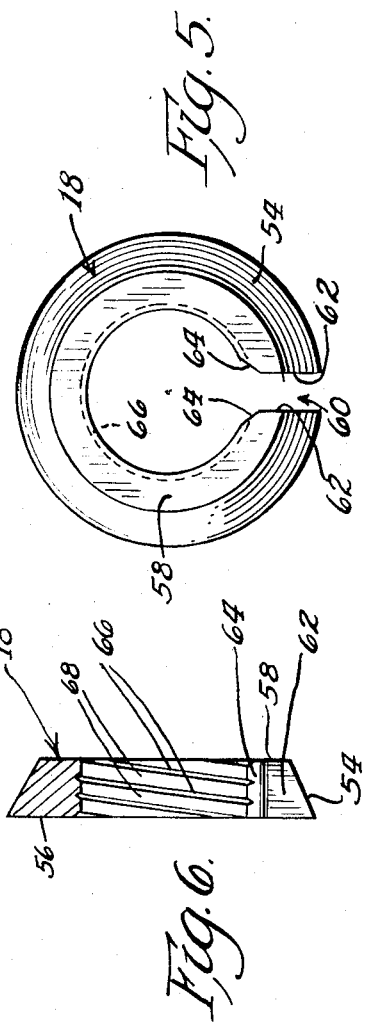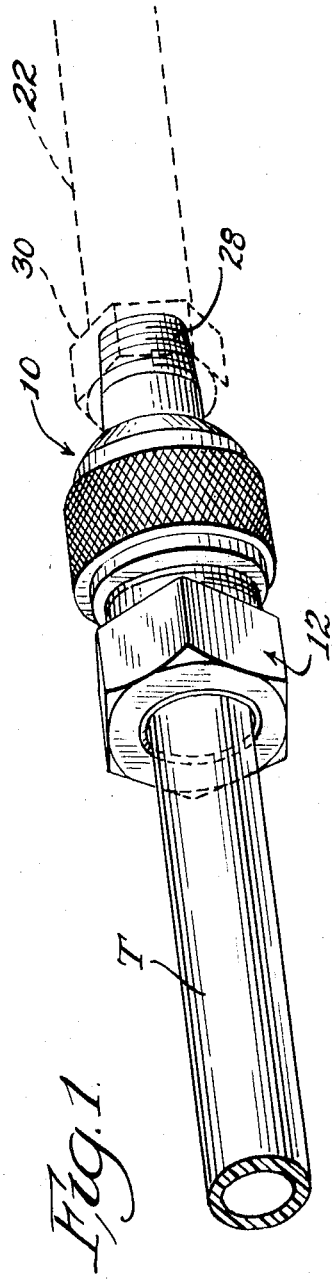

Inventor
Ronald W. Nicolaus
By
Atty.

PRESSURE FITTING FOR PLASTIC TUBING

The present invention relates to a pressure fitting which is adapted for use with plastic tubing and serves as a medium or instrumentality whereby one end of a length of such tubing may conveniently and operatively be connected in intercommunicating end-to-end relationship to a metal pipe section. The invention is designed primarily for use in connection with a commercial gas supply line wherein a length of flexible plastic tubing is employed as a lead-in connection from a ground-embedded gas main to a gas distribution pipe within a building, the present fitting being useable at either end of the tubing for connecting the latter either to the gas main or to the distribution pipe. The invention is, however, not limited to such use and a pressure fitting embodying the principles of the invention may, if desired and with or without modification as required, be employed as a tube-to-pipe fitting in a wide variety of hydraulic or pneumatic installations, regardless of whether such installations be high or low pressure ones. Furthermore, the invention, in its broadest aspect and insofar as its tube sealing aspects are concerned, is capable of use in connecting a length of plastic tubing to a pressure chamber or space regardless of whether such space be embodied in another tube or pipe section, a valve body, a diaphragm chamber, a pump or compressor body, or other equipment too numerous to mention. Irrespective, however, of the particular use to which the invention may be put, the essential features thereof are at all times preserved.

An essential requirement of a pressure fitting which is to be used at either end of a length of flexible plastic tubing between a gas supply line and a gas distribution pipe is the ability of the fitting to receive the adjacent end of the plastic tubing immediately after the latter has been cut and without the necessity of flaring, threading or otherwise treating the cut end of the tubing. In other words, such a fitting must be of the so-called "stab" type wherein the plastic tubing is first cut and then the cut end of the tubing is pushed into the partially assembled fitting, after which tightening of the fitting will effect a fluid-tight seal. It is obvious that the absence of a flared or threaded end on the plastic tubing ordinarily subjects the tubing joint or connection to low tension pullout factor. This low tension pullout factor is further enhanced by the relative ease with which plastic tubing will collapse when subjected to inward or centripetal forces. Additionally, lack of cohesiveness of the plastic material as compared to seamless flexible metal tubing contributes to rupture of the tubing at its anchor region within the fitting when pullout tension is applied to the tubing.

The present invention is designed to overcome the above-noted limitations that are attendant upon the construction of previously designed conventional pressure fittings and include the lack of such fittings having an adequate pullout factor. Accordingly, the invention contemplates the provision of an improved pressure fitting wherein, despite the fact that no flaring or other enlargement is provided at the proximate end of the plastic tubing, a high pullout factor is attained. According to the invention, there is provided the usual socketed fitting body and nut combination which is employed in connection with a pressure fitting of the type that is used for a tube-to-pipe connection, together with internal annular components which encircle the tubing and are disposed in the cavity or socket that is defined by the body and nut of the fitting. These internal components include a split pressure ring, a deformable elastomeric sealing ring, and an intermediate thrust ring which, when the nut is tightened in the fitting body, exerts sealing pressure on the sealing ring and, at the same time, deflects the split pressure ring in such a manner as to shrink the same upon the tubing and lock the latter against pullout from the fitting. A tube stiffener of tubular design is inserted within the cut end of the tubing prior to insertion of the tubing into the pressure fitting and this stiffener assimilates the inward pressure that is exerted by the split pressure ring when the nut of the fitting is tightened. The fitting body and nut combination, together with all of the internal annular components including the tube stiffener constitute a package-type pressure fitting which may be marketed in its entirety in a loosely assembled condition. After the plastic tubing has been cut to length, the cut end thereof may by a stab operation be projected into the thus assembled pressure fitting so that the stiffener enters the plastic tubing while at the same time the latter moves to its final home position within the pressure fitting. Upon tightening of the nut in the fitting body, the aforementioned sealing and locking functions are automatically completed and the fitting body is ready for connection to a pipe section which is associated with either a gas main or a gas distribution pipe as heretofore described.

The provision of a pressure fitting of the character briefly outlined above and possessing the stated advantages constitutes the principal object of the present invention.

Other objects and advantages of the invention, not at this time enumerated, will readily suggest themselves as the nature of the invention is better understood from a consideration of the following detailed description.

The invention consists in the several novel features which are hereinafter described and are more particularly defined by the claims at the conclusion hereof.

In the accompanying two sheets of drawings forming a part of this specification, one illustrative embodiment of the invention is shown.

In these drawings:

FIG. 1 is a perspective view of a tube-to-pipe pressure fitting embodying the principles of the present invention, the fitting being operatively applied to a length or section of plastic tubing and a metal pipe section;

FIG. 4 is an exploded perspective view of the various component parts of the improved pressure fitting;

FIG. 5 is an enlarged side elevational view of the particular split pressure ring which is employed in connection with the pressure fitting constituting the present invention; and FIG. 6 is a transverse sectional view taken on the line 6–6 of FIG. 5.

Figure 2:
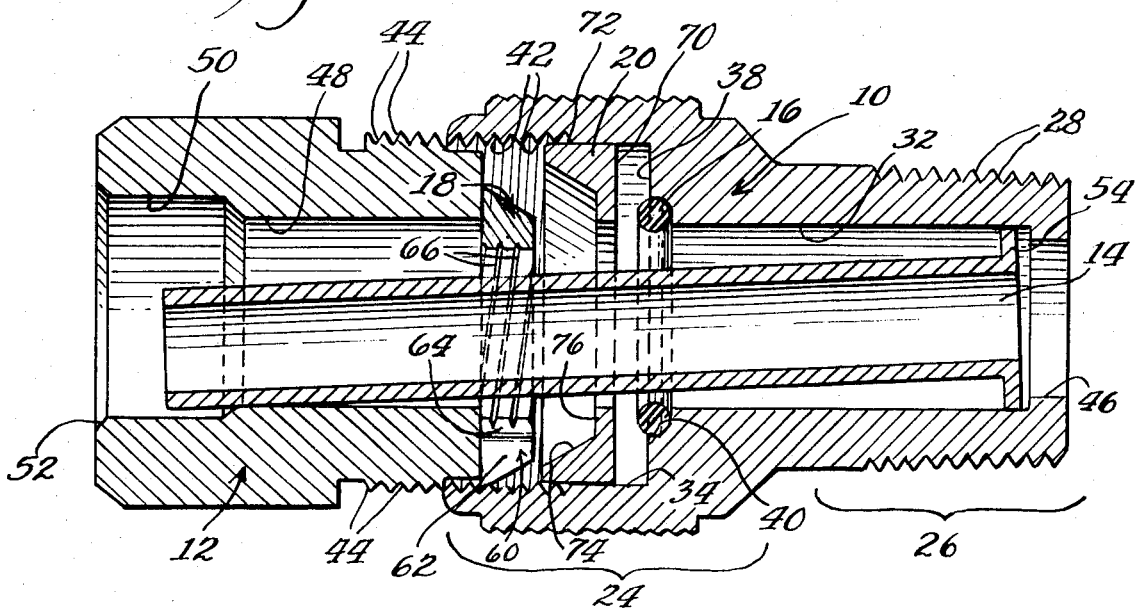
FIG. 2 is a sectional view taken centrally and longitudinally through the pressure fitting in its free state prior to application thereof to the plastic tube section.

Referring now to the drawings in detail, the pressure fitting of the present invention involves in its general organization the usual two principal external parts or components, namely, a fitting body 10 and a cooperating screw-threaded element or nut 12. The fitting further includes four internal components, namely, a tubing stiffener 14, an elastomeric sealing ring 16, a split pressure ring 18, and a thrust ring 20. The two principal external parts or components and the four internal components, when loosely assembled upon one another as shown in FIG. 2, constitute a package type fitting in the form of a socket-equipped assembly into one end of which the unthreaded and unflared cut end of a flexible plastic tubing section, such, for example, as the section T of of FIG. 1, is adapted to be projected by a so-called stab operation as will be described presently, after which the various parts of the fitting are tightened upon the tubing.

The fitting body 10 is preferably, but not necessarily, in the form of a screw machine part which is designed for attachment to a pipe section, such, for example, as the section 22. The latter is shown in dotted lines in FIG. 1 and may lead from a ground-embedded gas main or other gas enclosure (not shown) from which gas is adapted to be conducted through the pressure fitting, When the fitting body 10 is so attached and the tube section T is projected into the fitting and the fitting parts are tightened, there is established a leakproof connection which will not pull apart under ordinary conditions of usage.

Figure 3:
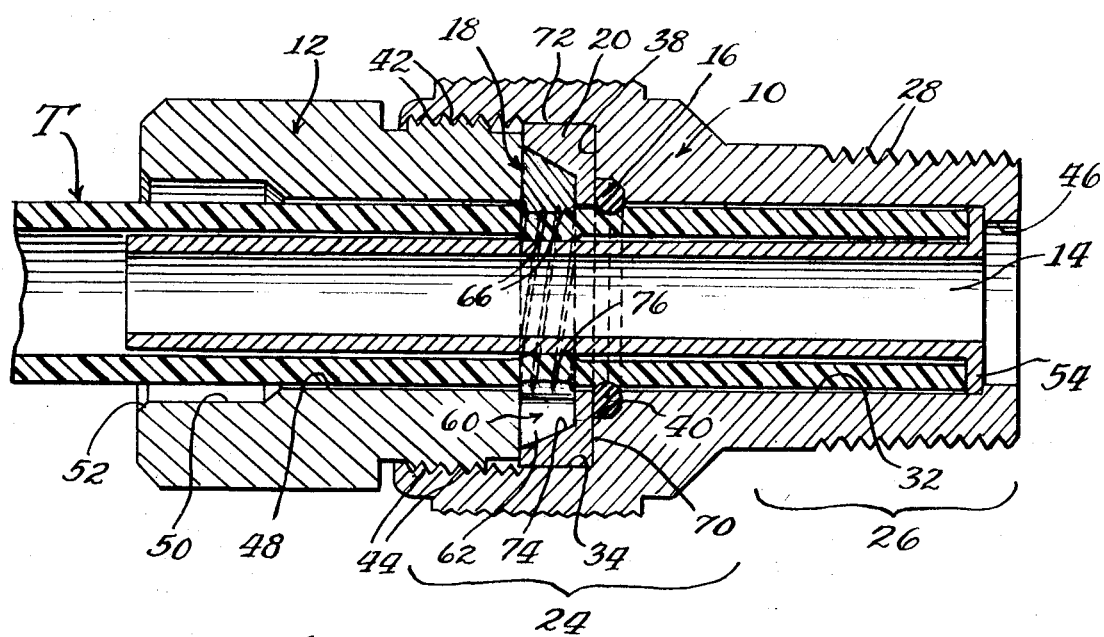
FIG. 3 is a sectional view similar to FIG. 2 but showing the pressure fitting operatively applied to the associated plastic tube section.

As shown in FIGS. 2, 3 and 4, the fitting body 10 is in the form of a tubular and generally cylindrical sleeve having an enlarged socket portion 24 at one end thereof and a reduced shank portion 26 at its other end. The outer surface of the socket portion 24 of the fitting body may be knurled or ribbed or it may be made hexagonal in order readily to receive a wrench or similar torque-applying tool. The reduced shank portion 26 of the fitting body is formed with an external screw thread 28 by means of which the body 10 may be connected to the pipe section 22 through the medium of a conventional cap fitting or union 30. An axial bore 32 extends through the reduced shank portion 26 of the fitting 10 and communicates at its inner end with an enlarged counterbore 34 in the socket portion 24. The counterbore 34 establishes within the fitting body a relatively deep socket 36 (see FIG. 4) which presents a radially extending annular bottom wall 38 (see FIGS. 2 and 3). Such bottom wall has formed in the inner portion thereof an annular recess 40 which immediately surrounds the bore 32 and into which the bore opens. The counterbore is formed with an internal screw thread 42 for threaded reception of an external screw thread 44 on the nut 12. At its outer end the shank portion 26 of the fitting body 10 is provided with an inturned annular retaining flange 46 the function of which will be described presently.

The nut 12 of the pressure fitting is tubular and of generally cylindrical design, the main body portion thereof being of hexagonal configuration so that the same may be gripped by a wrench or other torque-applying tool for tightening the nut with respect to the fitting body 10. An axial bore 48 extends longitudinally through the nut and is of the same diameter as that of the bore 32. The bore 48 communicates with an enlarged counterbore 50 near the outer end of the nut and this counterbore has a flared rim region 52 in order to facilitate insertion of the tube section T through the nut 12 and into the pressure fitting.

The tubing stiffener 14 extends through the body fitting 10 and the nut 12 and is in the form of a cylindrical steel tube having an outwardly turned rim flange 54 at the end thereof that is adjacent to the shank portion 26. The overall diameter of the rim flange 54 is substantially equal to the diameter of the bore 32 so that the outer face of said rim flange may bear against the inturned flange 46 on the outer end of the shank portion 26 of the fitting body 10 when the assembled pressure fitting is operatively installed upon the tubing section T as shown in FIG. 3. The outer cylindrical surface of the stiffener 14, in combination with the bores 32 and 48, establishes an annular space which is substantially completely filled by the plastic tubing section T when the latter is projected through the nut 12 and into the pressure fitting body 10 in such a manner as to encompass the stiffener 14 with the forward end of the tubing section bearing against the outwardly turned flange 54. The longitudinal extent of the stiffener 14 is approximately equal to the combined extent of the two coaxial bores 32 and 48 although the exact length of this stiffener is not to be considered as being critical.

The split pressure ring 18 is formed of suitable spring material, preferably brass, and it is generally trapezoidal in radial cross section, the ring presenting a frustoconical outer surface 54, a large annular base or side 56 and a small annular base or side 58. The ring is split as indicated at 60 to provide opposed flats 62. The flats 62 merge with inclined flats 64 which are cut away on a secant bias. The inner cylindrical surface of the split ring is provided with a series of parallel helical threads 66 the pitch direction of which runs counter to the pitch direction of the threads 44 on the nut 12. The threads 66 are of blunt configuration, which is to say that the crests thereof are flat as indicated at 68 in order to prevent cutting or rupturing of the plastic material of the tubing section T when the ring is shrunk upon the latter in a manner that will be described presently.

In its free state, the internal diameter of the split pressure ring 18 is slightly greater than the overall diameter of the plastic tubing section T but in the compressed state which it assumes when the nut 12 is tightened, the internal diameter of the ring is somewhat less than such overall diameter of the tubing section.

The thrust ring 20 is in the form of an annular member having a radially disposed flat radial end face 70 and a cylindrical outer surface 72. The flat radial end face 70 is at one end of the thrust ring 20 and faces in the direction of, and is normally positioned a small distance from, the annular bottom wall 38. The other end of the thrust ring is recessed in such manner as to provide an inwardly facing frustoconical surface 74 and a radial bottom surface 76. The outside diameter of the thrust ring 20 is substantially equal to the diameter of the counterbore 34 while the inside diameter of the ring is substantially equal to the outer diameter of the plastic tubing section T The slant angle of approximately 50° being employed in the illustrated form of the invention. As will be described in greater detail presently, the function of the frustoconical surface 74 is to effect shrinking of the split pressure ring 18 upon the plastic tubing section T at such time as the nut 12 forces the frustoconical outer surface 54 of the pressure ring 18 against the frustoconical surface 74 of the thrust ring 20.

The elastomeric sealing ring 16 is preferably in the form of a natural or synthetic rubber O-ring and fits snugly within the annular recess 40. The internal diameter of said sealing ring is slightly less than the diameter of the bore 32 to the end that the sealing ring grips frictionally the adjacent portion of the plastic tubing section T when the pressure fitting is in its assembled position. The diameter of the sealing ring 16 is slightly greater than the depth of the recess 40 with the result that when the pressure fitting is in its assembled position, the thrust ring 20 operates to compress the sealing ring and thereby cause it to become squeezed into firm gripping relation with the plastic tubing section T.

The herein described pressure fitting is adapted to be marketed in a preassembled condition so that when it is transported to a scene of installation, it will be ready for immediate use by the simple expedient of inserting an end of the flexible tubing section T into the bores 48 and 32 and so that it is in surrounding telescopic relation with respect to the tubular stiffener 14, the insertion being made through the enlarged counterbore 50 in the outer end of the nut 12. The partial assembly is made at the factory by the manufacturer by first inserting the stiffener 14 into the bore 32 in the fitting body 10. After this step, the elastomeric sealing ring 16 is telescoped over the stiffener 14 and caused to become nested within the recess 40. The thrust ring 20 and the split pressure ring 18 are then telescoped over the stiffener and slid to positions in the vicinity of the sealing ring 16, after which the nut 12 is loosely threaded into the socket which is afforded by the bore 34, this last step serving to capture the previously inserted components within the pressure fitting body 10. It will be observed that with the components or parts thus loosely assembled as shown in FIG. 2, the left-hand end of the stiffener 14 as viewed in such figure projects slightly outwards beyond the open outer rim of the nut 12 where it is accessible for telescopic reception of the tubing section T thereover at the time the tubing section is installed in the pressure fitting.

After the operator has telescoped the plastic tubing section T over the stiffener 14 and projected it into the bores 48 and 32 during field installation, the forward movement of the tubing sill cause the flange 54 of the stiffener 14 to bear against the inturned flange 46 of the fitting body 10 as shown in FIG. 3. During passage of the tubing section T into the bore 32, it will frictionally engage the sealing ring 16 through which it passes but it will clear the pressure ring 18 which, at this time, is in its normal expanded condition. Upon tightening of the nut 12 within the fitting body 10, the inner end face of the nut will engage the large base 56 of the split pressure ring 18 and force the frustoconical outer surface 54 of the ring against the frustoconical surface 74 of the thrust ring 20. The latter ring will thus be forced forwardly so that its flat radial end face 70 engages the bottom wall 38 of the socket 36, thus compressing the sealing ring 16 within the recess 40 and establishing a seal between the fitting body 10 and the plastic tubing section T. Further tightening of the nut 12 forces the split pressure ring 18 deeper into the frustoconical recess that is established by the surface 74, thus exerting a camming action on the split thrust ring so as to shrink the latter upon said plastic tubing section T. When the nut 12 is completely tightened, the side of the split ring 18 that faces in the direction of the sealing ring 16 will engage the bottom radial surface 76 while at the same time the inner end face of the nut 12 will engage the adjacent end face of the thrust ring 20. At this time, the split pressure ring 18 will be shrunk to the condition in which it is shown in FIG. 3 and wherein its inside diameter is less than the overall diameter of the plastic tubing section T. The section will thus be compressed throughout a narrow annular region and securely compressed in this region between the pressure ring 18 and the stiffener 14 so that it is securely locked against pullout tension. At the same time, leakage of gas or other fluid between the tubing section T and the fitting body 10 will be effectively prevented by the elastomeric sealing ring 16 which effects a fluid seal as previously described. It is to be noted at this point that the threads 66 on the split pressure ring 18, being left-hand threads since they oppose the pitch direction of the threads 44 on the nut 12, inhibit turning of the ring 18 either during tightening or loosening of the nut, thus avoiding frictional abrasion of the ring against the plastic material of the tubing section T. This factor, coupled with the blunt nature of the threads 66, protects the tubing section from rupture during both installation and removal of the fitting.

With the pressure fitting thus installed upon the tubing section T, application of the fitting to a pipe section such as that shown at 22 in FIG. 1 may be effected by means of a conventional cap fitting such as the fitting 30.

The invention is not to be limited to the exact arrangement of parts shown in the accompanying drawings or described in this specification as various changes in the details of construction may be resorted to without departing from the spirit or scope of the invention. For example, although the socket 36, together with the internal components 14, 16, 18 and 20 of the pressure fitting, are illustrated and described herein as being embodied in a fitting body such as the body 10, it is within the purview of the present invention to embody such socket and internal components directly in the body portion of a fluid mechanism such as a valve, a diaphragm, a pump, a compressor, a pneumatic or hydraulic cylinder, a pneumatic or hydraulic motor, a meter or other pneumatic or hydraulic apparatus too numerous to mention.

In view of such a contemplated use for the present invention, it is to be distinctly understood that, throughout this specification and in the appended claims, the term "fitting body," in addition to being inclusive of the recessed hardware fitting member 10, is to be construed as also being inclusive of a valve body, a pump body, or the body portion of any of a wide variety of pneumatic or hydraulic devices which are capable of being recessed to accommodate internal components such as have been described herein and are capable of cooperation with a fitting nut such as the nut 12.

It is further contemplated that the present pressure fitting may, if desired, be used as a tube-to-pipe pressure fitting wherein the tubing section T, instead of being formed of relatively soft plastic material, is formed of a metal such as copper or steel. In such an instance, the only modification of the illustrated structure which need be made is to omit the tubular stiffener 14 so that the inherent rigidity and resistance to compressional forces offered by the tubing section may be relied upon to assimilate the inward centripetal compressional force that is exerted by the pressure ring 18 under the camming influence of the frustoconical recess 74 when the nut 12 is tightened against such pressure ring. Therefore, only insofar as the invention is particularly pointed out in the accompanying claims is the same to be limited.

Having thus described the invention what I claim as new and desire to secure by Letters Patent is:

1. A pressure fitting for connecting one end of a length of resilient plastic tubing to a fluid enclosure, said fitting comprising a fitting body having an axial bore designed for communication with the enclosure and an enlarged counterbore which merges with the bore by way of an annular radial wall having an annular sealing recess at its inner portion, an elastomeric sealing ring seated in said recess, a tubing section of relatively soft yieldable resilient plastic material and of uniform outside diameter projecting through said counterbore and into said bore and fitting snugly within the latter, a tubular metal stiffener projecting through said counterbore and into the bore and fitting snugly within said tubing section, said counterbore, in combination with the adjacent portion of the tubing section, defining an annular socket within the fitting body, a socket-closing nut having a bore closely surrounding the tubing section and provided with a cylindrical section having threads received in said counterbore, the forward end face of the nut being spaced rearwardly from said radial wall and defining an annulus which surrounds the tube section a metal thrust ring surrounding the tubing section and having a flat radial front-end face and an annular recess in its rear side, said recess having a frustoconical inner wall and a radial bottom wall, a split pressure ring having a frustoconical outer wall, designed for camming engagement with said frustoconical inner wall and having a small radial front-end face designed for face-to-face contact with the radial bottom wall of the recess and a large radial rear end face designed for face-to-face engagement with the nut and a generally cylindrical inner surface designed for broad clamping area with the tubing section, the inside diameter of the pressure ring in its free state being greater than the overall diameter of the tubing section, said rear end face of the pressure ring being engageable with the nut so that upon tightening of the latter within the counterbore the pressure ring will be forced forwardly within the frustoconical recess, to effect camming engagement between the frustoconical outer wall thereof and the frustoconical inner wall of the recess and will thus become shrunk inwardly against the tubing section to clamp the latter to the stiffener and lock the tubing section against tensional pullout force, while at the same time the radial front end face of the pressure ring will seat against the bottom wall of the thrust ring and force the latter forwardly against the elastomeric sealing ring to deform the latter and cause the same to be forced in sealing relationship against the tubing section and fitting body.

2. A pressure fitting as set forth in claim 1, wherein said stiffener is provided with a radial rim flange on the forward end thereof and the bore is provided with an inturned flange at its forward end which is engageable with the rim flange on the stiffener to limit the extent of forward projection of the stiffener.

3. A pressure fitting as set forth in claim 2 and wherein said radial rim flange on the stiffener projects radially outwardly beyond the inside rim of the sealing ring when the latter is in its free state, thus retaining the stiffener within the confines of the fitting body prior to tightening of the nut.

4. A pressure fitting as set forth in claim 2 and wherein said generally cylindrical inner surface of the split pressure ring is provided with helical threads of pitch direction counter to the pitch direction of the threads on said nut, the crest regions of the helical threads on said pressure ring being flat.